United States Patent
Belwafa et al.

(10) Patent No.: US 9,227,587 B1
(45) Date of Patent: Jan. 5, 2016

(54) VEHICLE OBLIQUE IMPACT ABSORBING SYSTEM

(71) Applicant: Ford Global Technologies, LLC, Dearborn, MI (US)

(72) Inventors: Jamel E. Belwafa, Ann Arbor, MI (US); Saeed David Barbat, Novi, MI (US); Mohamed Ridha Baccouche, Ann Arbor, MI (US); Raed Essa El-Jawahri, Northville, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 14/604,831

(22) Filed: Jan. 26, 2015

(51) Int. Cl.
| | |
|---|---|
| *B60R 21/231* | (2011.01) |
| *B60R 21/205* | (2011.01) |
| *B60R 21/20* | (2011.01) |
| *B60R 21/215* | (2011.01) |
| *B60R 21/235* | (2006.01) |
| *B60R 21/013* | (2006.01) |
| *B60R 21/232* | (2011.01) |
| *B62D 1/11* | (2006.01) |

(52) U.S. Cl.
CPC .............. *B60R 21/205* (2013.01); *B60R 21/20* (2013.01); *B60R 21/23138* (2013.01); *B60R 21/013* (2013.01); *B60R 21/232* (2013.01); *B60R 2021/21506* (2013.01); *B60R 2021/23123* (2013.01); *B60R 2021/23161* (2013.01); *B60R 2021/23509* (2013.01); *B62D 1/11* (2013.01)

(58) Field of Classification Search
CPC .............. B60R 2021/23123; B60R 21/23138; B60R 21/232; B60R 21/205
USPC ....................................... 280/730.2
See application file for complete search history.

(56) References Cited

U.S. PATENT DOCUMENTS

| | | | | |
|---|---|---|---|---|
| 3,791,667 | A | * | 2/1974 | Haviland ................. 280/730.2 |
| 5,470,103 | A | * | 11/1995 | Vaillancourt et al. ...... 280/730.1 |
| 8,297,648 | B2 | | 10/2012 | Komoll et al. |
| 2005/0275199 | A1 | | 12/2005 | Helmstetter |
| 2007/0296191 | A1 | * | 12/2007 | Brinker ...................... 280/742 |

FOREIGN PATENT DOCUMENTS

| | | | |
|---|---|---|---|
| JP | 2006256508 | 9/2006 | |
| JP | 2010201980 | 9/2010 | |
| JP | 201151513 | 3/2011 | |
| JP | 2015120382 A | * 7/2015 | .............. B60R 21/20 |

OTHER PUBLICATIONS

Saeki et al., "A Fundamental Study of Frontal Oblique Offset Impacts", Nissan Motor Co., Ltd., Japan, Paper No. 264 (9 pages).

* cited by examiner

*Primary Examiner* — Faye M Fleming
(74) *Attorney, Agent, or Firm* — Frank A. MacKenzie; Bejin Bieneman PLC

(57) ABSTRACT

An instrument panel assembly includes a frame, a first airbag supported by the frame, a second airbag supported by the frame spaced from the first airbag, and an intermediate airbag supported by the frame between the first and second airbags. The first, second, and intermediate airbags are inflatable to an inflated position in which the intermediate airbag extends from the first airbag to the second airbag.

20 Claims, 9 Drawing Sheets

VEHICLE OBLIQUE IMPACT ABSORBING SYSTEM

BACKGROUND

Automobiles are subject to a variety of crash tests, including standard tests regulated by the National Highway Traffic Safety Administration (NHTSA). For example, these tests may be directed toward oblique impacts, i.e., impacts that occur at an angle of 10-50 degrees relative to a vehicle's trajectory. During the oblique impact, occupants of the vehicle move forward and laterally. As one example of an oblique impact test, a moving cart with a deformable barrier moves at 56 mph and impacts a stationary vehicle at a 15 degree angle with a 35% overlap.

Several types of information are measured during the oblique crash test, including airbag performance, test dummy reaction, etc. One type of measurement are the Brain Injury Criteria (BrIC) values during the oblique impact. The BrIC values characterize occupant movement. There remains an opportunity to design a system to absorb crash energy during the oblique impact.

DETAILED DESCRIPTION

Figure 8:
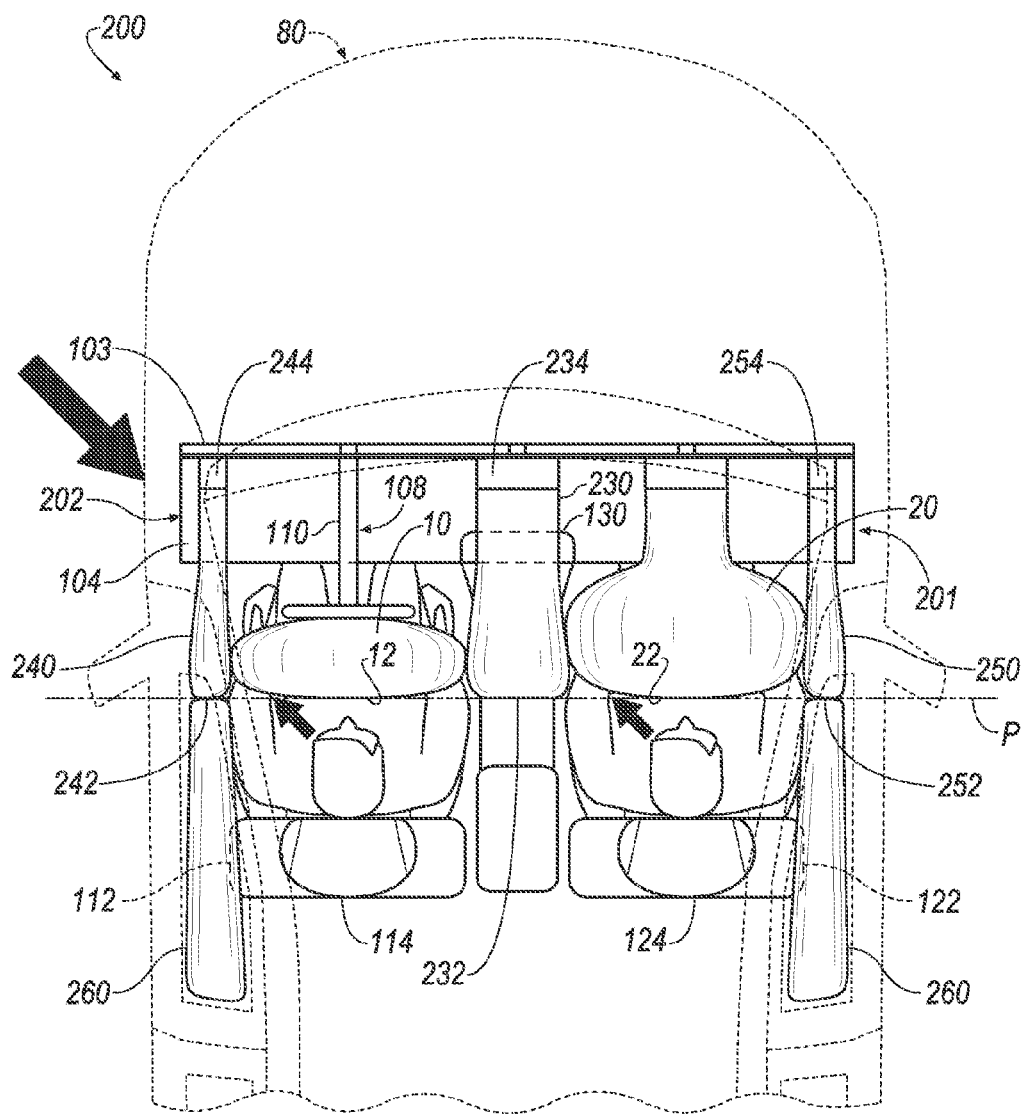
FIG. 8 is a plan view of a second embodiment of the impact absorbing system with the airbags in the inflated position.
Figure 9:
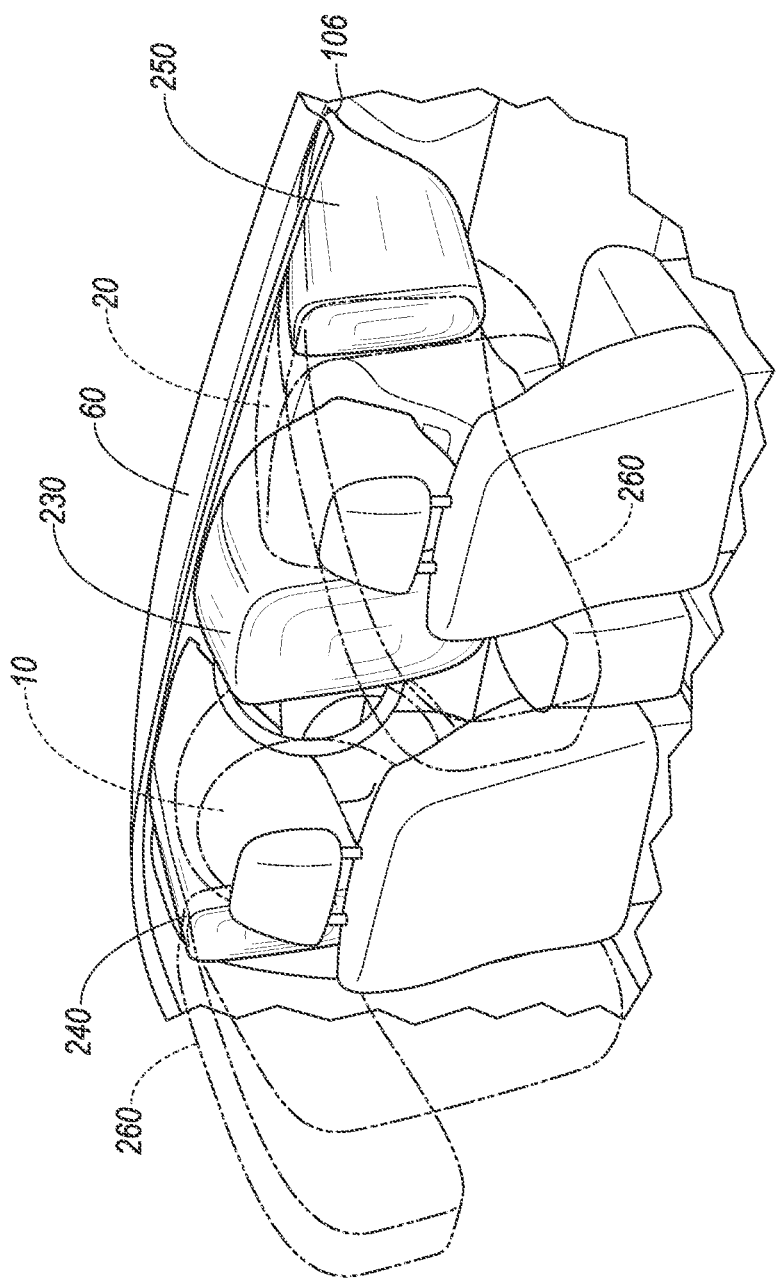
FIG. 9 is a perspective view of the second embodiment of the impact absorbing system with the airbags in the inflated position.

With reference to the Figures, wherein like numerals indicate like parts throughout the several views, an instrument panel assembly 101, 201 of a vehicle 80 includes an instrument panel 102, 202 having a frame 103 and a covering 104. A first airbag 10 is supported by the frame 103. A second airbag 20 is supported by the frame 103 and is spaced from the first airbag 10. An intermediate airbag 30, 230 is supported by the frame 103 between the first and second airbags 10, 20. The first, second, and intermediate airbags 10, 20, 30, 230 are inflatable to an inflated position as shown in FIGS. 2 and 3B-9. The intermediate airbag 30, 230 extends from the first airbag 10 to the second airbag 20 in the inflated position. A first embodiment of an impact absorbing system 100, for example, is shown in FIGS. 1-7, and a second embodiment of the impact absorbing system 200 is shown in FIGS. 8-9. Common numerals are used to identify common parts in the first and second embodiments 100, 200.

Figure 1:
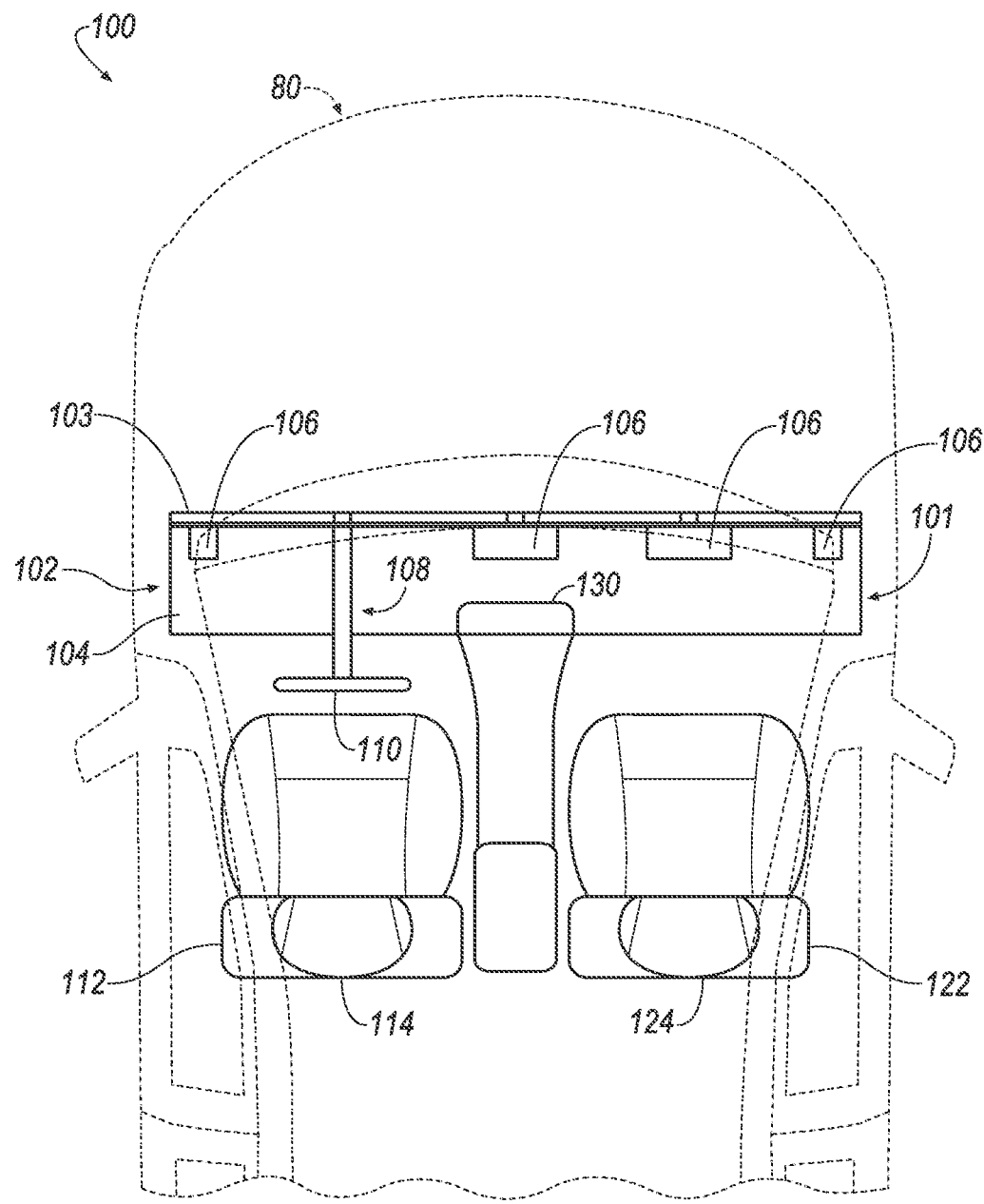
FIG. 1 is a plan view of a vehicle including a first embodiment of an impact absorbing system with airbags of the impact absorbing system in an uninflated position.
Figure 3A:
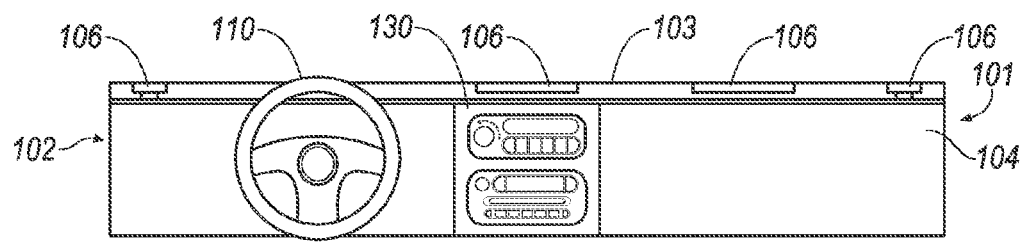
FIG. 3A is a front view of a first embodiment of an instrument panel assembly of the vehicle including the airbags in the uninflated position.
Figure 3B:
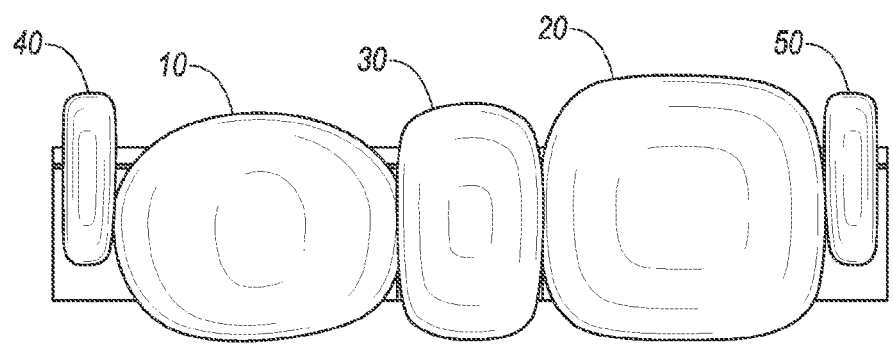
FIG. 3B is a front view of the first embodiment of the instrument panel assembly with the airbags in the inflated position.

During an oblique impact, occupants of the vehicle 80 may move both forward and laterally relative to the vehicle 80. The direction of the impact determines how occupants move within the vehicle 80 during the vehicle impact; in particular, oblique and side impacts cause occupants to move in a lateral direction. The intermediate airbag 30, 230 is positioned to absorb energy from occupants and control the head kinematics during lateral movement. Upon vehicle impact, the first airbag 10, second airbag 20, and the intermediate airbag 30, 230 deploy from an uninflated position, as shown in FIGS. 1 and 3A, to the inflated position to receive the occupants.

The vehicle 80 includes an instrument panel assembly 101, 201. The instrument panel assembly 101, 201 includes the instrument panel 102, 202, the airbags 10, 20, 30, 230, and, as set forth further below, a steering assembly 108.

The frame 103 of the instrument panel 102, 202 is mounted to a component of the vehicle 80, e.g., the body of the vehicle 80. The frame 103 supports the covering 104 and various vehicle components. The frame 103 may be constructed of metal, plastic, and/or any other suitable material.

The covering 104 may be constructed of vinyl, plastic, foam, and/or any other suitable material. The covering 104 may be constructed to provide an aesthetic appearance to the instrument panel 102, 202.

The instrument panel 102, 202 may include panels 106 covering the second airbag 20 and the intermediate airbag 30, 230. Specifically, the covering 104 of the instrument panel 102, 202 may define cutouts (not shown) adjacent to the second airbag 20 and the intermediate airbag 30, 230 and the panels 106 may be releasably fixed to the covering 104 such that the second and intermediate airbags 20, 30, 230 may displace the panels 106 through the cutouts during inflation. The panels 106 may be frangibly connected to the covering 104, such as a friction fit, an adhesive, and/or other suitable configuration. The panels 106 may be attached in any manner that allows the second airbag 20 and the intermediate airbag 30, 230 to expand into the inflated position, e.g., with a hinge and/or tethers, etc. The panels 106 may be constructed of the same material as the covering 104 in a manner to match the aesthetic appearance of the covering 104.

As shown in FIGS. 1 and 8, the steering assembly 108 may include a steering column (not shown) and a steering wheel 110 supported on the steering column. The steering column may be mounted to the frame 103 of the instrument panel 102, 202 in any suitable fashion The steering wheel 110 may be of any suitable configuration. The first airbag 10 may be supported within the steering wheel 110 to absorb energy from a driver of the vehicle 80.

The instrument panel assembly 101, 201 may include a control cluster 130. The control cluster 130 may also be mounted to the frame 103. Specifically, the intermediate airbag 30, 230 may be mounted to the frame 103 of the instrument panel 102, 202 above the control cluster 130. The control cluster 130 may include devices such as a radio, climate controls, and a navigation system. The intermediate airbag 30, 230 may be disposed above the control cluster 130. The control cluster 130 may be located between a first front seat 112 and a second front seat 122 of the vehicle 80.

The instrument panel assembly 101, 201 may include a first airbag module 14. The first airbag module 14 may include a first box (not shown), a first inflator 16, and the first airbag 10.

The first airbag module 14 may be supported by the frame 103 of the instrument panel 102, 202. The first airbag module 14 may be supported by the steering assembly 108. When the first airbag 10 is in the inflated position, the first airbag 10 has an end 12 spaced distal relative to the instrument panel 102, 202. The driver may contact the end 12 when the driver moves forward during vehicle impact. The first airbag 10 may be constructed of fabric and/or any other suitable material.

The instrument panel assembly 101, 201 may include a second airbag module 24. The second airbag module 24 may include a second box (not shown), a second inflator 26, and the second airbag 20. The second airbag module 24 may be supported by the frame 103 of the instrument panel 102, 202. When the second airbag 20 is in the inflated position, the second airbag 20 has an end 22 spaced distal relative to the instrument panel 102, 202. The passenger may contact the end 22 of the second airbag 20 when the passenger moves forward during vehicle impact. The second airbag 20 may be constructed of fabric and/or any other suitable material.

The instrument panel assembly 101, 201 may include an intermediate airbag module 34, 234. The intermediate airbag module 34, 234 may include an intermediate box (not shown), an intermediate inflator 36, and the intermediate airbag 30, 230 in the uninflated position. The intermediate airbag module 34, 234 may be supported by the frame 103 of the instrument panel 102, 202. The intermediate airbag 30, 230 has an end 32, 232 spaced distal relative to the instrument panel 102, 202. The intermediate airbag 30, 230 may be constructed of fabric and/or any other suitable material.

The instrument panel assembly 101, 201 may include a first corner airbag module 44, 244. The first corner airbag module 44, 244 includes a first corner box (not shown), a first corner inflator 46, and a first corner airbag 40, 240 in the uninflated position. The first corner airbag module 44, 244 may be supported by the frame 103 of the instrument panel 102, 202 The first airbag 10 is between the first corner airbag 40, 240 and the intermediate airbag 30, 230. The first corner airbag 40, 240 may be disposed on the left side of the vehicle 80, i.e., the driver side of the vehicle 80. The first corner airbag 40, 240 allows for energy absorption during the oblique impact that moves the driver away from the intermediate airbag 30, 230, e.g., when the driver moves diagonally away from the intermediate airbag 30, 230, such as in FIG. 5. The first corner airbag 40, 240 may be covered by one of the panels 106 as described above.

Figure 4:
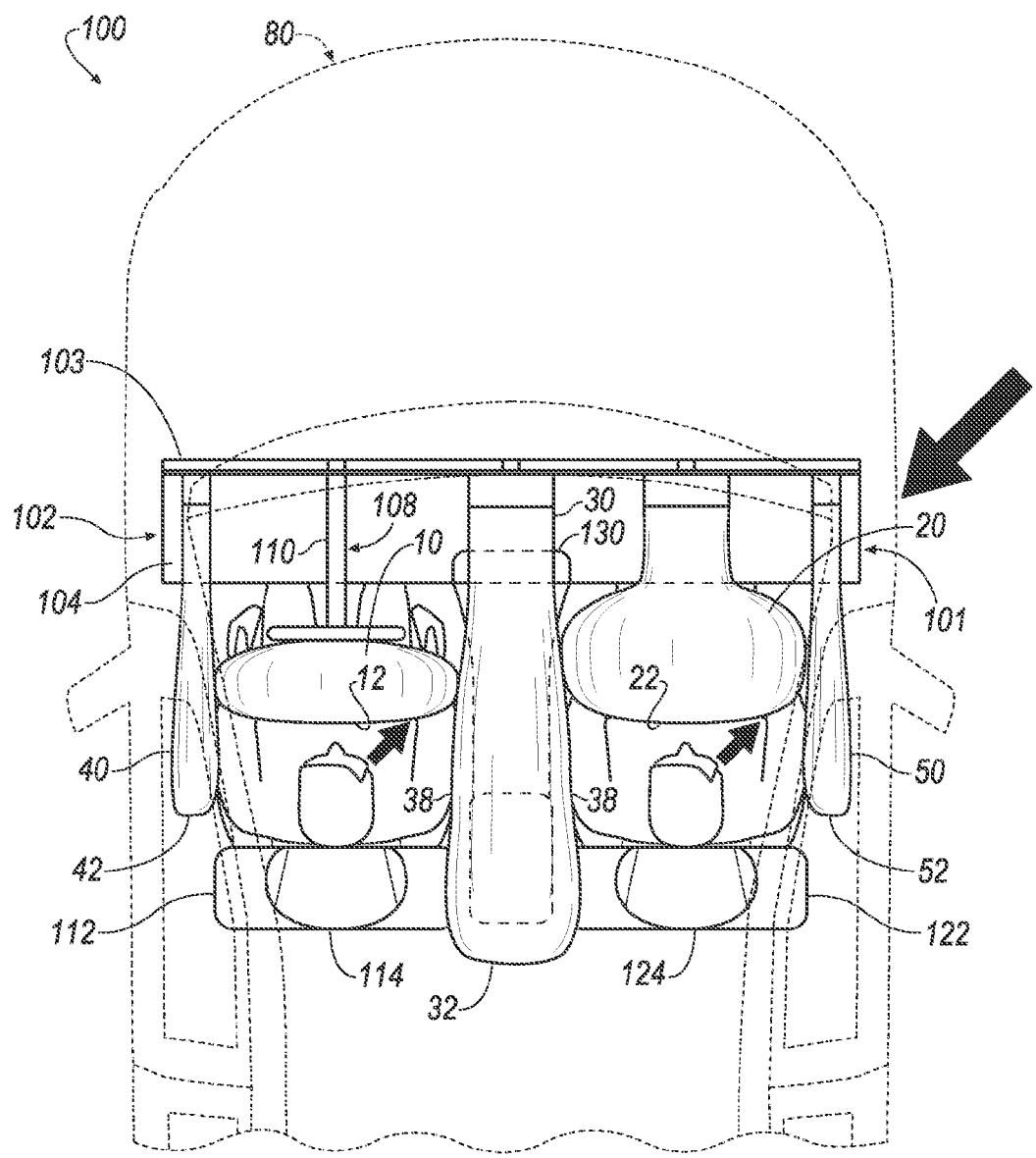
FIG. 4 is a plan view of the first embodiment of the impact absorbing system during an oblique impact from a right side of the vehicle.

The instrument panel assembly 101, 201 may include a second corner airbag module 54, 254. The second corner airbag module 54, 254 includes a second corner box (not shown), a second corner inflator 56, and a second corner airbag 50, 250 in the uninflated position. The second corner airbag module 54, 254 may be supported by the frame 103 of the instrument panel 102, 202. The second airbag 20 is between the second corner airbag 50, 250 and the intermediate airbag 30, 230. The second corner airbag 50, 250 may be disposed on the right side vehicle 80, i.e., the passenger side of the vehicle 80. The second corner airbag 50, 250 allows for energy absorption during the vehicle impact that moves the passenger away from the intermediate airbag 30, 230. The second corner airbag 50, 250 may operate in conjunction with the first corner airbag 40, 240 to absorb energy from occupants during vehicle impact from several directions. For example, as shown in FIG. 4, when the oblique impact moves the passenger away from the intermediate airbag 30, the second corner airbag 50 will receive the passenger. The second corner airbag 50, 250 may be covered by one of the panels 106.

The boxes of the airbag modules 14, 24, 34, 234, 44, 244, 54, 254 may be of any suitable type and construction, e.g., a rigid polymer, a metal, or a combination of rigid materials. The boxes may be mounted to the frame 103 and/or the covering 104 to advantageously allow the airbags 10, 20, 30, 230, 40, 240, 50, 250 to deploy into the inflated position and to account for packaging space. The boxes may be configured to house the airbags 10, 20, 30, 230, 40, 240, 50, 250 in the uninflated position and support the airbags 10, 20, 30, 230, 40, 240, 50, 250 in the inflated position.

The inflators 16, 26, 36, 46, 56 may be of any suitable type, e.g., cold gas inflators. The inflators 16, 26, 36, 46, 56 may be disposed in the boxes of the airbag modules 14, 24, 34, 234, 44, 244, 54, 254.

Figure 7:
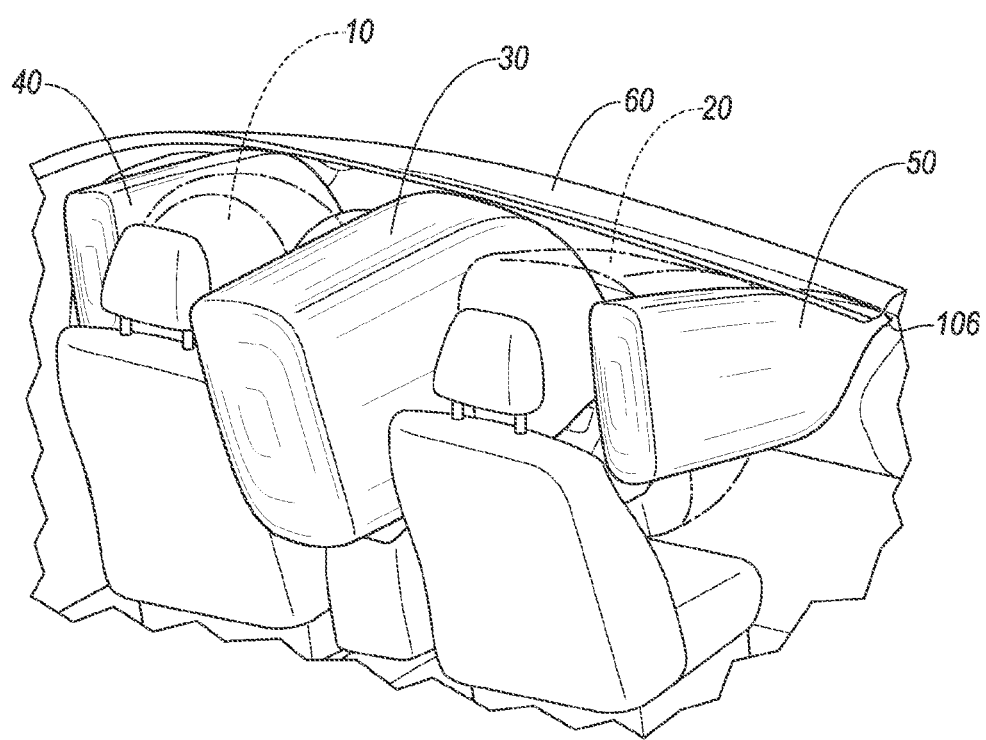
FIG. 7 is a perspective view of the first embodiment of the impact absorbing system with the airbags in the inflated position.

As shown in FIGS. 7 and 9, upon vehicle impact, the first airbag 10, the second airbag 20, the intermediate airbag 30, 230, the first corner airbag 40, 240, and the second corner airbag 50, 250 inflate into the inflated position and force the panels 106 open. A windshield 60 of the vehicle 80 may be a reaction surface. In other words, the windshield 60 may be angled relative to the instrument panel 102, 202 and may direct the airbags 10, 20, 30, 230, 40, 240, 50, 250 into the vehicle 80 during inflation.

An impact absorbing system 100, 200 of the vehicle 80 may include the instrument panel 102, 202, the first front seat 112, and the second front seat 122. Specifically, the first front seat 112 may include a first seat back 114 and the second front seat 122 may include a second seat back 124 spaced from the first seat back 114.

In the first embodiment, the end 32 of the intermediate airbag 30 may be spaced farther from the instrument panel 102 than the end 12 of the first airbag 10 or the end 22 of the second airbag 20. By extending farther from the instrument panel 102, the intermediate airbag 30 can receive occupants during vehicle impact from multiple directions, e.g., lateral motion during the oblique impact or side impact.

Figure 5:
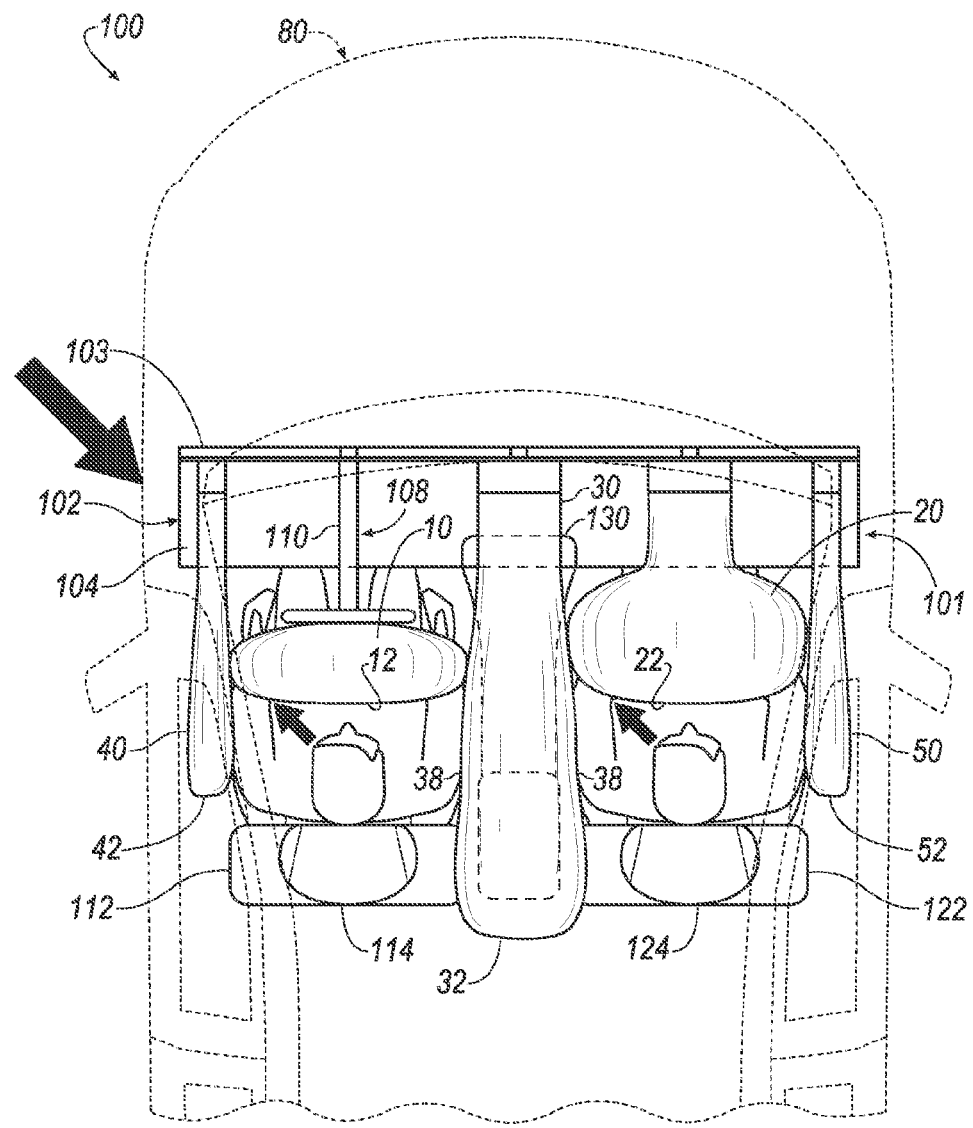
FIG. 5 is a plan view of the first embodiment of the impact absorbing system during an oblique impact from a left side of the vehicle.
Figure 6:
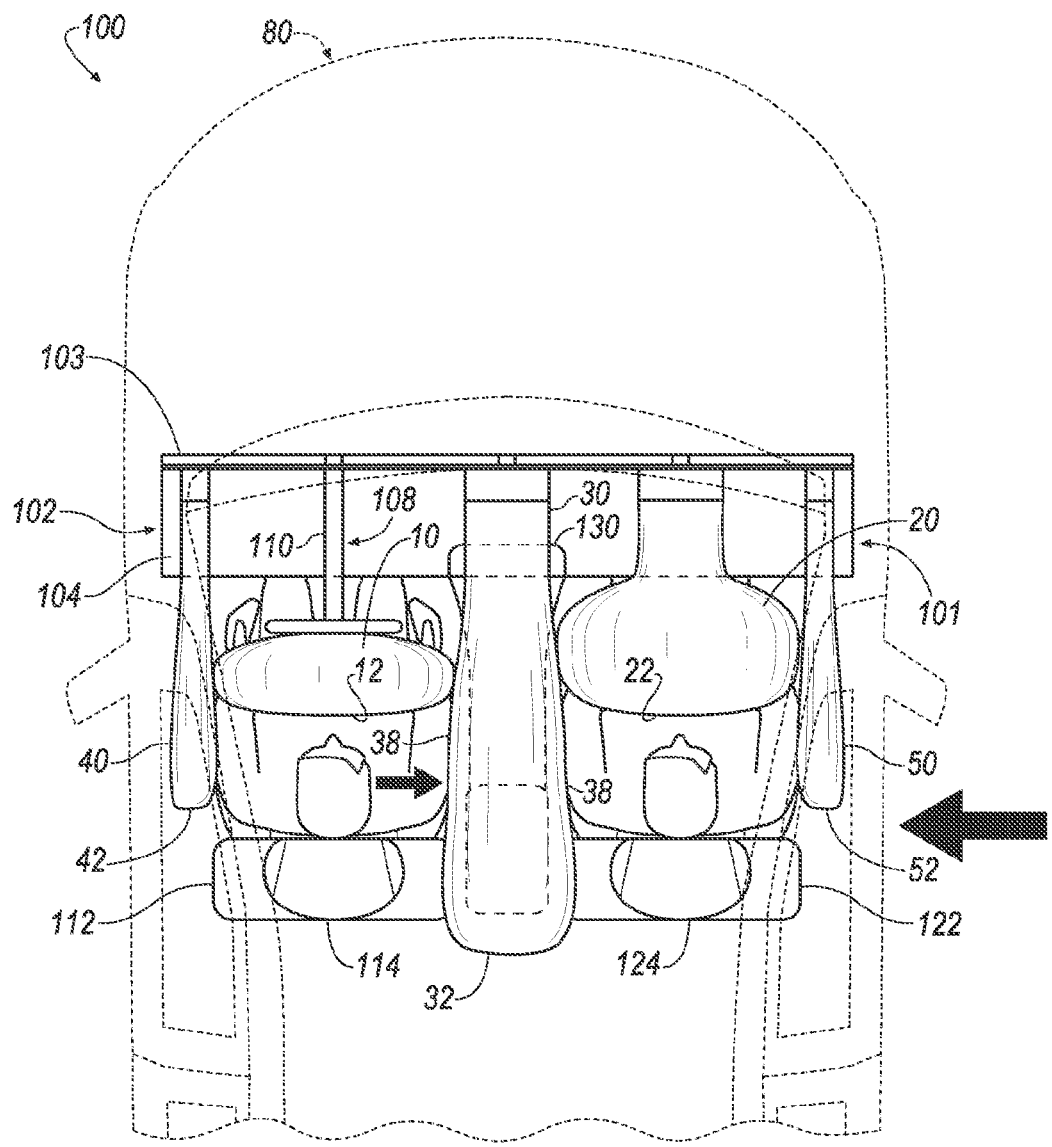
FIG. 6 is a plan view of the first embodiment of the impact absorbing system during a side impact.

In the first embodiment, the intermediate airbag 30 in the inflated position may be disposed between the first and second seat backs 114, 124 to receive an occupant in the first front seat 112 or the second front seat 122 during vehicle impact from several directions. For example, if the oblique impact comes from the front and left direction, the passenger may move toward the front and left into the intermediate airbag 30 as shown in FIG. 5. The passenger's energy will be absorbed by the intermediate airbag 30 disposed between the first and second seat backs 114, 124.

In the first embodiment, when the intermediate airbag 30 is in the inflated position, the intermediate airbag 30 has an impact surface 38 extending from the first airbag 10 to the second airbag 20. The impact surface 38 absorbs energy from the occupants during vehicle impact when the occupants move in a manner that avoids all or part of the first and second airbags 10, 20, such as an oblique impact. The oblique impact forces the occupants to move laterally onto the impact surface 38.

With further reference to the first embodiment, the first airbag 10 has an inflated length 10L defined as the length from the first inflator 16 to the end 12 of the first airbag 10. The second airbag 20 has a second inflated length 20L defined as the length from the second inflator 26 to the end 22 of the second airbag 20. The intermediate airbag 30 has an intermediate inflated length 30L extending from the intermediate inflator 36 to the end 32 of the intermediate airbag 30.

In the first embodiment, the intermediate inflated length 30L may be longer than the first and/or second inflated lengths 10L, 20L, allowing the intermediate airbag 30 to receive the driver and the passenger during the oblique impact. For example, in FIG. 4, the oblique impact forces the driver into the impact surface 38. In FIG. 5, the passenger moves into the intermediate airbag 30 at the impact surface 38. And in FIG. 6, a side impact moves the driver into the intermediate airbag 30 at the impact surface 38. Because the intermediate inflated length 30L extends beyond the first and second airbags 10, 20, the occupants may be received during these vehicle impacts.

Figure 2:
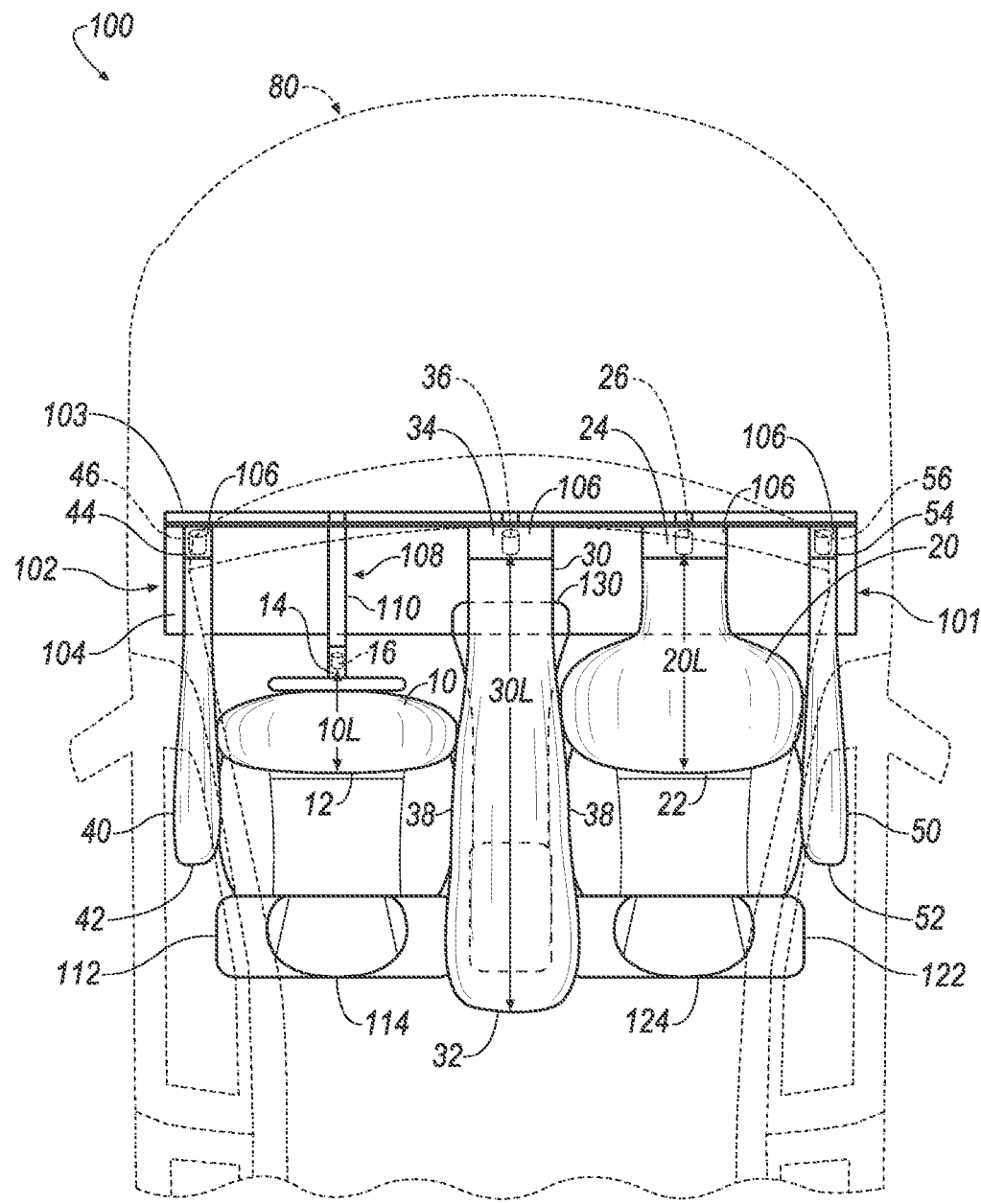
FIG. 2 is a plan view of the vehicle including the first embodiment of the impact absorbing system with the airbags of the impact absorbing system in an inflated position.

In the first embodiment, as shown in FIG. 2, the first corner airbag 40 has an end 42 spaced distal from the instrument panel 102 and the second corner airbag 50 has an end 52 spaced distal from the instrument panel 102. The ends 42, 52 of the first and second corner airbags 40, 50 may extend farther into the vehicle 80 than the ends 12, 22 of the first and second airbags 10, 20. Alternatively, in the first embodiment, the end 12 of the first airbag 10 and/or the end 22 of the second airbag may extend farther into the vehicle 80 than the ends 42, 52 of the first and second corner airbags 40, 50.

As shown in FIG. 4, during the oblique impact, the driver may move forward and to the right. The driver may directly hit or glance off of the first airbag 10, moving into the intermediate airbag 30, which absorbs energy from the driver. The passenger may directly hit or glance off of the second airbag 20, moving into the second corner airbag 50.

Similarly, as shown in FIG. 5, during the oblique impact, the passenger may move forward and to the left. The passenger may directly hit or glance off of the second airbag 20, moving into the intermediate airbag 30, which absorbs energy from the passenger. The driver may directly hit or glance off of the first airbag 10, moving into the first corner airbag 40.

As set forth above, the second embodiment of the impact absorbing system 200 is shown in FIGS. 8 and 9. The intermediate airbag 230 has an end 232 spaced distal relative to the instrument panel 202 and is disposed above the central console 130. The first corner airbag 240 has an end 242 spaced distal relative to the instrument panel 202 and the second corner airbag 250 has an end 252 spaced distal relative to the instrument panel 202. The end 12 of the first airbag 10, the end 22 of the second airbag 20, the end 232 of the intermediate airbag 230, the end 242 of the first corner airbag 240, and the end 252 of the second corner airbag 250 may be substantially aligned in a plane P in the inflated position, i.e., positioned along a straight line substantially parallel to a lateral axis of the vehicle 80.

As shown in FIGS. 8 and 9, the impact absorbing system 200 may include curtain airbags 260. The curtain airbags 260 in the inflated position may cover at least a portion of an interior side of the vehicle 80. The curtain airbags 260 may contact the first corner airbag 240 and/or the second corner airbag 250. The curtain airbags 260 are mounted in a headliner (not shown) of the vehicle 80 and may extend downwardly from the headliner when deployed.

As shown in FIG. 8, during the oblique impact in the second embodiment, the passenger may move forward and to the left. The passenger may directly hit or glance off of the second airbag 20, moving into the intermediate airbag 230, which absorbs energy from the passenger. The driver may directly hit or glance off of the first airbag 10, moving into the first corner airbag 240.

The impact absorbing system 100, 200 of the vehicle 80 may include an impact sensor (not shown), and a controller (not shown) in communication with the inflators 16, 26, 36, 46, 56. Upon vehicle impact, the controller activates the inflators 16, 26, 36, 46, 56 to inflate the airbags 10, 20, 30, 230, 40, 240, 50, 250.

The controller may be a microprocessor-based controller. The impact sensor is in communication with the controller to communicate data to the controller. The impact sensor may be of any suitable type, e.g., using accelerometers, radar, lidar, and/or a vision system. The vision system may include one or more cameras, CCD image sensors, and/or CMOS image sensors, etc.

The controller and the impact sensor may be connected to a communication bus (not shown), such as a controller area network (CAN) bus, of the vehicle 80. The controller may use the information from the communication bus to control the activation of the inflators 16, 26, 36, 46, 56. The inflators 16, 26, 36, 46, 56 may alternatively be connected to the communication bus directly.

As used herein, the adverb "substantially" means that a shape, structure, measurement, quantity, time, etc. may deviate from an exact described geometry, distance, measurement, quantity, time, etc., because of, for example, imperfections in materials, machining, manufacturing, etc., as one example, ±5%.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An impact absorbing system for a vehicle, the system comprising:
   an instrument panel;
   a first airbag supported by the instrument panel;
   a second airbag supported by the instrument panel and spaced from the first airbag; and
   an intermediate airbag supported by the instrument panel in an uninflated position between the first and second airbags;
   wherein the first, second, and intermediate airbags are inflatable to an inflated position, the intermediate airbag extending from the first airbag to the second airbag when the first, second, and intermediate airbags are in the inflated position.

2. The vehicle impact absorbing system of claim 1, wherein the first airbag, second airbag, and intermediate airbag each include an end distal relative to the instrument panel, wherein the end of the intermediate airbag is spaced farther from the instrument panel than the end of the first airbag and the end of the second airbag are spaced from the instrument panel.

3. The vehicle impact absorbing system of claim 1, wherein the first airbag, second airbag, and intermediate airbag each include an end distal relative to the instrument panel, wherein the ends of the first, second, and intermediate airbags are substantially aligned in a plane.

4. The vehicle impact absorbing system of claim 3, further comprising a first corner airbag supported by the instrument panel with the first airbag between the first corner airbag and the intermediate airbag, the first corner airbag including an end distal relative to the instrument panel and substantially aligned in the plane.

5. The vehicle impact absorbing system of claim 1, further comprising a first inflator in communication with the first airbag and defining an inflated length from the first inflator to an end of the first airbag in the inflated position, a second inflator in communication with the second airbag and defining an inflated length from the second inflator to an end of the second airbag, and an intermediate inflator in communication with the intermediate airbag and defining an inflated length from the intermediate inflator to an end of the intermediate airbag, wherein the inflated length of the intermediate airbag is greater than the inflated length of the first airbag and the inflated length of the second airbag.

6. The vehicle impact absorbing system of claim 1, further comprising a first corner airbag supported by the instrument panel and inflatable to an inflated position, the first airbag being between the first corner airbag and the intermediate airbag.

7. The vehicle impact absorbing system of claim 6, further comprising a second corner airbag supported by the instrument panel and inflatable to an inflated position, the second airbag being between the second corner airbag and the intermediate airbag.

8. The vehicle impact absorbing system of claim 1, further comprising a first seat back and a second seat back spaced from the first seat back, wherein the intermediate airbag in the inflated position is disposed between the first seat back and the second seat back.

9. The vehicle impact absorbing system of claim 1, further comprising a steering wheel supported by the instrument panel and supporting the first airbag.

10. The vehicle impact absorbing system of claim 9, wherein the instrument panel includes a panel spaced from the steering wheel and covering the second airbag.

11. The vehicle impact absorbing system of claim 10, further comprising a control cluster between the steering wheel and the panel, wherein the intermediate airbag is disposed above the control cluster.

12. An instrument panel assembly comprising:
a frame;
a first airbag supported by the frame;
a second airbag supported by the frame and spaced from the first airbag; and
an intermediate airbag supported by the frame in an uninflated position between the first and second airbags;
wherein the first, second, and intermediate airbags are inflatable to an inflated position, the intermediate airbag extending from the first airbag to the second airbag when the first, second, and intermediate airbags are in the inflated position.

13. The instrument panel assembly of claim 12, wherein the first airbag, second airbag, and intermediate airbag each include an end distal relative to the frame, wherein the end of the intermediate airbag is spaced farther from the frame than the end of the first airbag and the end of the second airbag are spaced from the frame.

14. The instrument panel assembly of claim 12, wherein the first airbag, second airbag, and intermediate airbag each include an end distal relative to the frame, and the ends of the first, second, and intermediate airbags are substantially aligned in a plane.

15. The instrument panel assembly of claim 14, further comprising a first corner airbag supported by the frame with the first airbag between the first corner airbag and the intermediate airbag, the first corner airbag including an end distal relative to the frame and substantially aligned in the plane.

16. The instrument panel assembly of claim 12, further comprising a first inflator in communication with the first airbag and defining an inflated length from the first inflator to an end of the first airbag in the inflated position, a second inflator in communication with the second airbag and defining an inflated length from the second inflator to an end of the second airbag, and an intermediate inflator in communication with the intermediate airbag and defining an inflated length from the intermediate inflator to an end of the intermediate airbag, wherein the inflated length of the intermediate airbag is greater than the inflated length of the first airbag and the inflated length of the second airbag.

17. The instrument panel assembly of claim 12, further comprising a first corner airbag supported by the frame and inflatable to an inflated position, the first airbag being between the first corner airbag and the intermediate airbag.

18. The instrument panel assembly of claim 17, further comprising a second corner airbag supported by the frame and inflatable to an inflated position, the second airbag being between the second corner airbag and the intermediate airbag.

19. The instrument panel assembly of claim 12, further comprising a covering and a panel frangibly connected to the covering spaced from a steering wheel and covering the second airbag.

20. The instrument panel assembly of claim 19, further comprising a control cluster between the steering wheel and the panel, wherein the intermediate airbag is disposed above the control cluster.

* * * * *